(12) United States Patent
Sunada et al.

(10) Patent No.: US 7,187,480 B2
(45) Date of Patent: Mar. 6, 2007

(54) IMAGE FORMING APPARATUS WITH CONTROL FOR INTERRUPTING AN IMAGE FORMATION JOB, METHOD OF CONTROLLING SAID IMAGE FORMING APPARATUS, AND STORAGE MEDIUM WITH A PROGRAM STORED THEREON FOR PERFORMING IMAGE FORMING APPARATUS CONTROL

(75) Inventors: Hidenori Sunada, Ibaraki (JP); Takashi Fujimori, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1048 days.

(21) Appl. No.: 10/284,145

(22) Filed: Oct. 31, 2002

(65) Prior Publication Data
US 2003/0095280 A1    May 22, 2003

(30) Foreign Application Priority Data
Nov. 20, 2001   (JP)   ............................ 2001-355321

(51) Int. Cl.
*H04N 1/04*   (2006.01)

(52) U.S. Cl. .................... 358/498; 358/1.14; 358/1.15; 700/223

(58) Field of Classification Search ............... 358/1.14, 358/1.1, 1.15; 700/223
See application file for complete search history.

(56) References Cited

U.S. PATENT DOCUMENTS 6,914,690 B1 *   7/2005   Uchida ....................... 358/1.14
2001/0018626 A1 *   8/2001   Moriyama et al. .......... 700/223

* cited by examiner

*Primary Examiner*—Edward Coles
*Assistant Examiner*—Heather D Gibbs
(74) *Attorney, Agent, or Firm*—Fitzpatrick, Cella, Harper & Scinto (57) ABSTRACT

An image forming apparatus has a feeder for feeding a sheet, an image forming unit for performing an image formation job so as to form an image on a sheet fed from the feeder, a controller for interrupting a current image formation job, performing an interrupt image formation job, and resuming the current image formation job after completion of the interrupt image formation job. When the current image formation job uses a sheet feeder for feeding sheets set in a predetermined order, the controller prevents the sheet feeder used in the current image formation job from being used in the interrupt image formation job.

14 Claims, 11 Drawing Sheets

| | | |
|---|---|---|
| TOTAL NUMBER OF SHEET FEEDER UNITS | : Nmaxfeed | ~601 |

INFORMATION ABOUT SHEET FEEDER UNIT 1:

| | | |
|---|---|---|
| SHEET FEEDER UNIT NUMBER | : 1 | ~602 |
| SHEET FEEDER UNIT STATUS | : ENABLED | ~603 |
| SHEET SIZE | : A4 (VERTICAL) | ~604 |
| SHEET TYPE | : NORMAL | ~605 |
| NUMBER OF REMAINING SHEETS | : MORE THAN 50% | ~606 |

⋮

INFORMATION ABOUT SHEET FEEDER UNIT m:

| | | |
|---|---|---|
| SHEET FEEDER UNIT NUMBER | : m | ~607 |
| SHEET FEEDER UNIT STATUS | : ENABLED | ~608 |
| SHEET SIZE | : A4 (VERTICAL) | ~609 |
| SHEET TYPE | : TAB | ~610 |
| NUMBER OF REMAINING SHEETS | : LESS THAN 25% | ~611 |

⋮

INFORMATION ABOUT SHEET FEEDER UNIT Nmaxfeed:

| | | |
|---|---|---|
| SHEET FEEDER UNIT NUMBER | : Nmaxfeed | ~612 |
| SHEET FEEDER UNIT STATUS | : JAMMED | ~613 |
| SHEET SIZE | : A3 (HORIZONTAL) | ~614 |
| SHEET TYPE | : RECYCLED PAPER | ~615 |
| NUMBER OF REMAINING SHEETS | : MORE THAN 50% | ~616 |

IMAGE FORMING APPARATUS WITH CONTROL FOR INTERRUPTING AN IMAGE FORMATION JOB, METHOD OF CONTROLLING SAID IMAGE FORMING APPARATUS, AND STORAGE MEDIUM WITH A PROGRAM STORED THEREON FOR PERFORMING IMAGE FORMING APPARATUS CONTROL

BACKGROUND OF THE INVENTION

1. Field of the Invention

The present invention relates to an image forming apparatus capable of performing another image formation job by interrupting a current image formation job and, after completion of that image formation job, resuming the previous image formation job.

2. Description of the Related Art

In recent years, with advances in network technology and the technology of digitally processing image data, it has become popular to integrate various apparatuses such as a copying machine, a printer, a facsimile machine, and a scanner, into a single multifunction apparatus capable of providing various functions. In such a multifunction apparatus, a large number of processing requests are often issued at the same time by users via an operation control unit of the apparatus or via a network. To deal with such a situation, the multifunction apparatus is capable of accepting a plurality of requests for performing various functions and also capable of performing a plurality of processes in response to the plurality of processing requests, both individually or in parallel in an efficient manner.

However, even in a case in which a plurality of requests including a similar process are issued at the same time, only one request is processed and the other requests have to wait for completion of the process being currently performed. For example, when a copy request and a print request are issued at the same time, one of the two requests has to wait for completion of the process of printing on sheets performed in response to the other request. If the process being currently performed needs a long time to complete, the waiting process cannot be started until the current process has been completed. Thus, it takes a long time to complete the waiting process even if the waiting process itself needs a short time.

To avoid the above problem, it is known to interrupt a process being currently performed and perform another process as an interrupt image formation job. In this method, priority is given to each processing request, and if a processing request having high priority is issued in the middle of performing a process having lower priority, the current process is interrupted at a proper time and the high-priority process is performed. After completion of the high-priority process, the interrupted process is resumed.

Before starting the interrupt image formation job, data indicating the setting of the current image formation job (interrupted image formation job) is saved. When the interrupt image formation job is completed, the setting of the previous job (interrupted image formation job) is automatically recovered and the previous job is resumed correctly. However, a change can occur in the amount of an expendable supply relative to the amount before the interrupt because the interrupt image formation job consumes the expendable supply.

In a case in which the expendable supply consumed during the interrupt image formation job is a supply such as sheets or toner which is not of a special type, the same type of supply remains in a storage unit. That is, in this case, no change occurs in the type of the supply during the interrupt job, and thus there is no problem as along as a sufficient amount of supply remains. However, if ordered sheets whose order is important, such as tab sheets whose tab position vary from one sheet to another, are consumed during an interrupt image formation job, the interrupted image formation job will encounter a difference in the order of sheets when it is resumed, and thus the interrupted image formation job will resume in a manner different from an intended manner.

SUMMARY OF THE INVENTION

The present invention provides an image forming apparatus comprising a plurality of feeders for feeding a sheet; an image forming unit for performing an image formation job so as to form an image on a sheet fed from one of the feeders; and a controller for interrupting a current image formation job, performing another image formation job, and resuming the current image formation job after completion of the interrupt image formation job. In a case in which the current image formation job uses a sheet feeder for feeding sheets set in a predetermined order, the controller prevents the sheet feeder used in the previous image formation job from being used in said another image formation job.

In accordance with another aspect of the invention there is provided an image forming apparatus with a plurality of sheet feeders, each for feeding a sheet, an image forming unit which performs an image formation job on a sheet fed from one of the plurality of sheet feeders and a controller for performing a subsequent image formation job after completion of a current image formation job. In a case in which the previous image formation job uses a sheet feeder for feeding sheets set in a predetermined order, the controller prevents the sheet feeder used in the current image formation job from being used in the subsequent image formation job.

In accordance with yet another aspect of the present invention there is provided a method of controlling an image forming apparatus, the method having the steps of determining which feeder from a plurality of feeders was used in a current image formation job, determining whether sheets set in the feeder used in the current image formation job are set in a predetermined order, and in a case in which the current image formation job uses a sheet feeder for feeding sheets set in a predetermined order, preventing the sheet feeder used in the current image formation job from being used in a subsequent image formation job.

In accordance with yet another aspect of the applicants invention there is provided a computer-readable storage medium which includes a printer driver program stored thereon for causing an image forming apparatus to form an image on a sheet fed from one of a plurality of feeders, the printer driver program having code for determining which feeder is used in a current image formation job, code for determining whether sheets placed on the feeder used in the current image formation job are set in a predetermined order, and code for, in a case in which the sheet feeder for feeding sheets set in a predetermined order is used in the current image formation job, preventing the sheet feeder used in the current image formation job from being used in a subsequent image formation job.

Further objects, features and advantages of the present invention will become apparent from the following description of the preferred embodiments with refer to the attached drawings.

DECRIPTION OF THE PREFERRED EMBODIMENTS

The present invention is described in further detail below with reference to preferred embodiments in conjunction with the accompanying drawings.

First Embodiment

An image forming apparatus according to a first embodiment of the present invention, described first below, is a digital copying machine capable of, when setting is performed for a job to be performed by interrupting a current job in which an image is formed on tab sheets, disabling selection of a sheet feeder unit storing tab sheets used in the job to be interrupted.

Figure 1:
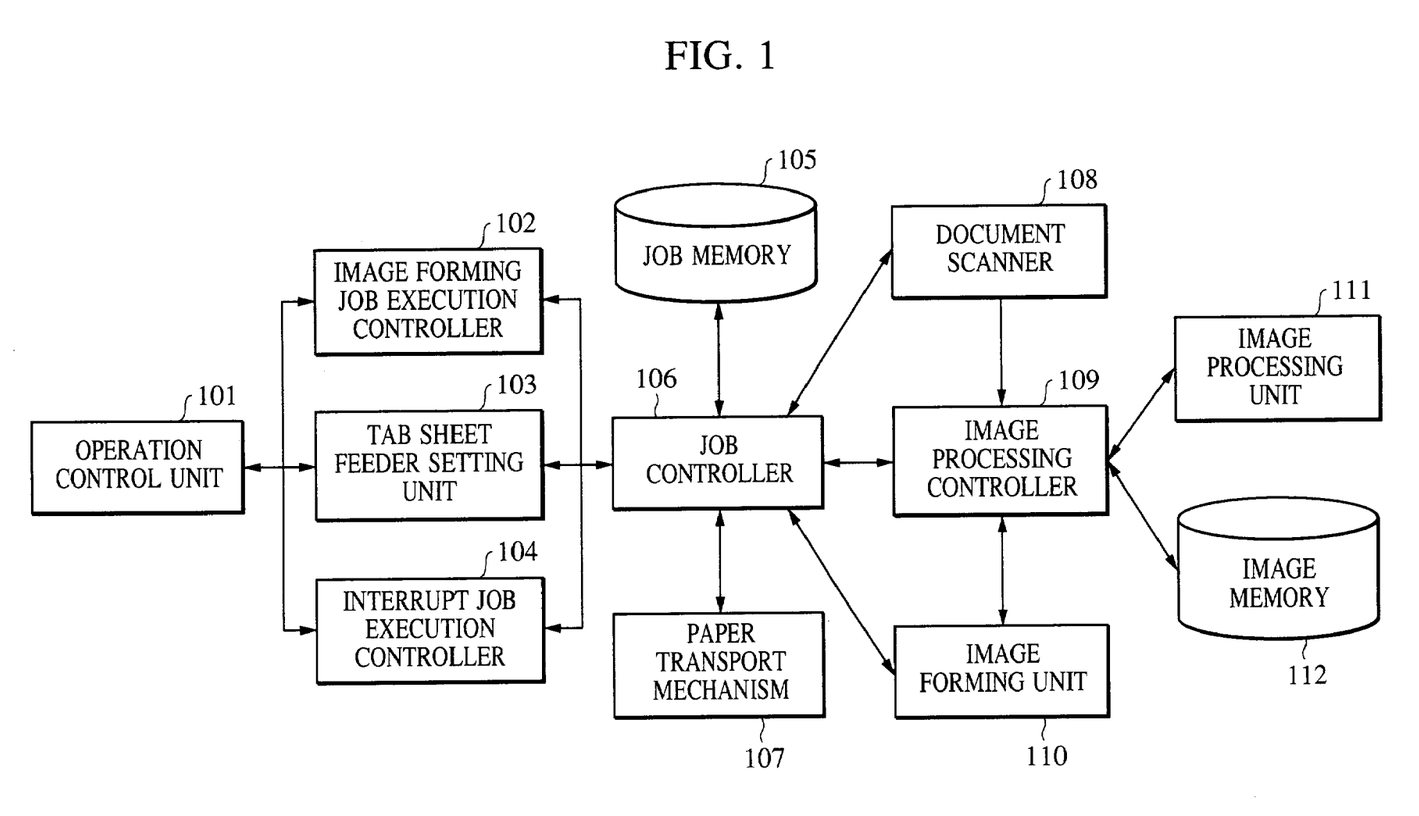
FIG. 1 is a block diagram of a digital copying machine according to a first embodiment of the present invention.

FIG. 1 shows a functional configuration of the digital copying machine according to the present invention. In FIG. 1, reference numeral 101 denotes an operation control unit for performing various operations of the digital copying machine, issuing commands such as an image formation job execution command, and displaying states of various items. A command issued by the operation control unit 101 is supplied to a job controller 106 via an image forming job execution controller 102, a tab sheet feeder unit 103, or an interrupt job execution controller 104, wherein the job controller 106 is responsible for generally controlling the digital copying machine according to the present embodiment.

The tab sheet feeder setting unit 103 is used to designate tab sheets as sheets to be used in an image formation job. In accordance with a command issued by the tab sheet feed setting unit 103, a sheet transport mechanism 107 transports a sheet, which may be of one of various types such as a tab sheet, to an image formation position. The tab sheet feeder setting unit 103 is also used to specify the number of divisions of tab sheets or the tab size.

The interrupt job execution controller 104 is a controller for, when an image formation job started in response to a command issued by the image formation job execution controller 102 is being processed, interrupting the image formation job being currently processed and performing a new image formation job. Before starting the new image formation job, information about the interrupted job is saved in a job memory 105. When the interrupt image formation job is completed, the job information stored in the job memory 105 is returned to the job controller 106, and the interrupted job is resumed.

Reference numeral 108 denotes a document scanner for scanning an image of a document placed on the document platen and converting the document image into digital image information. Reference numeral 109 denotes an image processing controller for controlling image processing performed on the digital image information output from the document scanner 108. More specifically, the image processing controller 109 generally controls various kinds of image processing such as shading, background image removal, scaling, and rotation by issuing a necessary command to an image processing unit 111. Reference numeral 112 denotes an image memory for storing digital image information output from the document scanner 108 and processed by the image processing unit 111. In general, a HDD or a RAM may be used as the image memory 112.

The image processing controller 109 forms an image on a recording sheet in accordance with digital image information by performing a process including reading digital image information stored in the image memory 112 and transmitting the read digital image information to the image formation unit 110, in conjunction with the job controller 106 controlling the sheet transport mechanism to transport the recording sheet to the image formation position.

Figure 2:
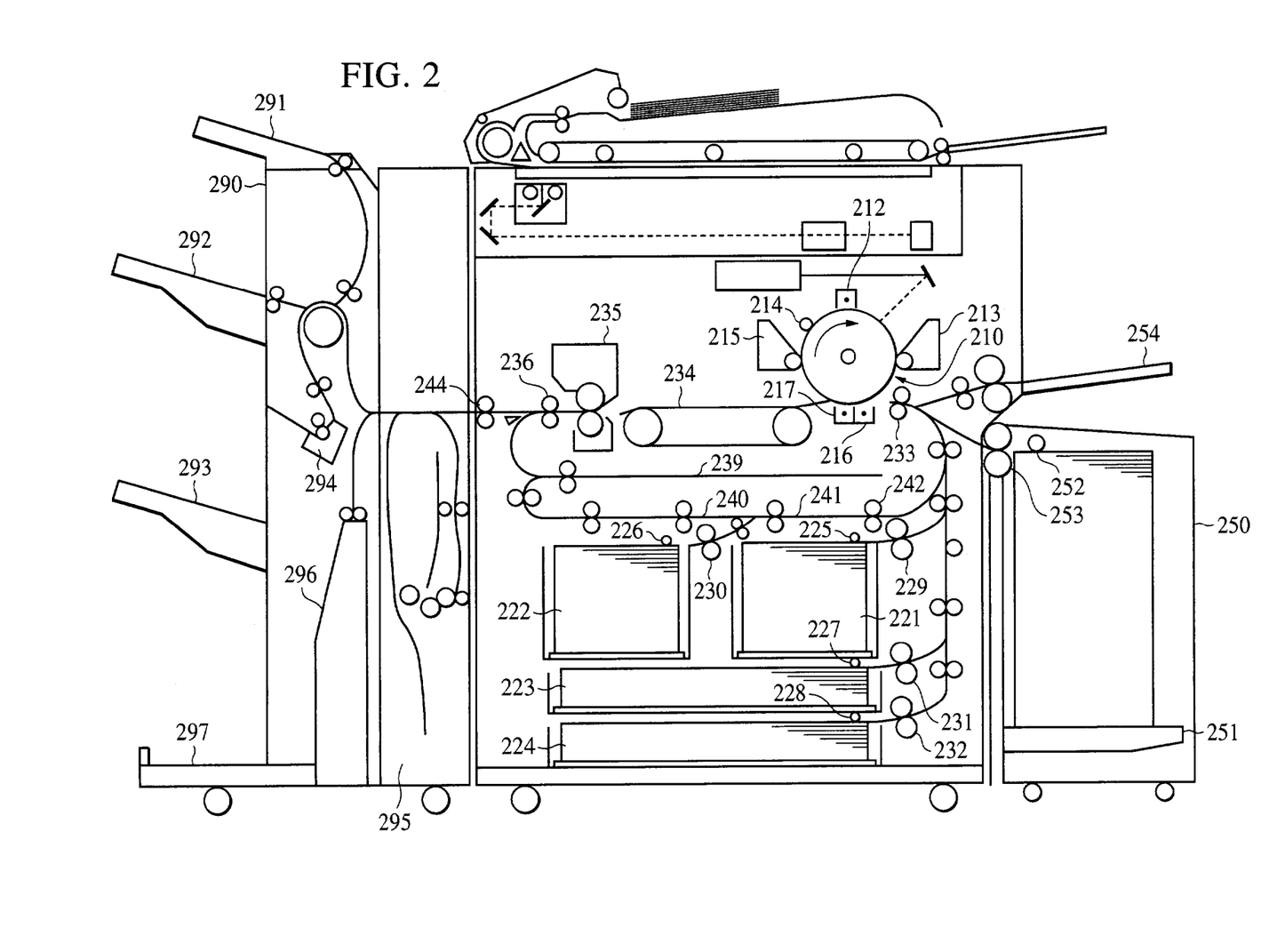
FIG. 2 is a cross-sectional view of the digital copying machine according to the first embodiment of the present invention.

FIG. 2 shows a typical structure of the digital copying machine. In FIG. 2, reference numeral 100 denotes the main unit of the digital copying machine, and 280 denotes an automatic document feeder (ADF). Reference numeral 201 denotes platen glass serving as a document platen on which a document is placed, and 202 denotes a scanning unit including a document illumination lamp 203 and a scanning mirror 204. As the scanning unit 202 is moved back and forth in a predetermined direction by a motor (not shown), light reflected from the document is reflected by scanning mirrors 204 to 206, passed through a lens 207, and is projected onto a CCD sensor in an image sensor unit 208 such that an image of the document is formed on the CCD sensor.

Reference numeral 209 denotes an exposure controller including a laser and a polygon scanner, for illuminating a photosensitive drum 211 with a laser beam 219 modulated in accordance with an image signal subjected to particular image processing after being output as an electric signal from the image sensor unit 208. Around the photosensitive drum 211, there are disposed a first charger 212, a developing unit 213, a transfer charger 216, a pre-exposure lamp 214, and a cleaning unit 215. In an image forming part 210, the photosensitive drum 211 being rotated by a motor (not shown) in a direction denoted by an arrow in FIG. 2 is charged to a predetermined voltage by the first charger 212 and then the photosensitive drum 211 is illuminated by a laser beam 219 emitted from the exposure controller 209 thereby forming an electrostatic latent image. The electrostatic latent image formed on the photosensitive drum 211 is developed by the developing unit 213 into a visible toner image.

A recording sheet is fed from a sheet cassette selected from a right cassette deck 221, a left cassette deck 222, an upper cassette 233, and a lower cassette 224. The recording sheet is fed to the main part of the digital copying machine via pickup rollers 225, 226, 227, and 228 and via feed rollers 229, 230, 231, and 232. The recording sheet is then transported to an image transfer belt by a registration roller 233, and the visible toner image is transferred to the recording sheet by the transfer charger 216. After completion of transferring of the image, toner remaining on the photosensitive drum is removed by the cleaning unit 215, and an electric charge remaining on the photosensitive drum is removed by the pre-exposure lamp 214. The recording sheet having the image transferred thereon is separated from the photosensitive drum by the separation charger 217 and transported to a fixing unit 235 by the image transfer belt 234. The fixing unit fixes the image by means of applying a pressure and heat. The recording sheet is then ejected to the outside of the main part 100 by a feed-out roller 236.

The main part 100 has a deck 250 capable of holding up to 3500 sheets. A lifter 251 of the deck 250 moves upward in response to a change in the number of remaining recording sheets so that a recording sheet at the top is always in contact with the pickup roller 252 and so that the recording sheet at the top can be fed into the main part by a feed roller 253. There is also provided a manual sheet feeder unit 254 capable of holding up to 100 recording sheets.

Furthermore, in FIG. 2, reference numeral 237 denotes a sheet guide flapper for guiding a recording sheet to either a transport path 238 or an ejection path 243. Reference numeral 240 denotes a lower transport path for guiding a recording sheet fed out by the feed-out roller 236 to a re-feeding path 241 via an inverting path 239 such that the recording sheet arrives at the re-feeding path 241 after being turned over. Also in the case in which a recording sheet is fed from the left cassette deck 222 by the feed roller 230, the recording sheet is transported to the re-feeding path 241. Reference numeral 242 denotes a re-feeding roller for re-feeding a recording sheet to the image formation unit 210. Reference numeral 244 denotes an feed-out roller disposed close to the sheet guide flapper 237, for ejecting a recording sheet guided to the ejection path 243 by the sheet guide flapper 237 to the outside of the copying machine.

When printing (copying) is performed on both sides of a sheet, the sheet guide flapper 237 is moved into a rising-up position so that a recording sheet on which an image has been formed is guided to the re-feeding path 241 via the transport path 238, the inverting path 239, and the lower transport path 240. In this case, a recording sheet is transported by the inverting rollers 245 into the inverting path 239 until the recording sheet comes to a position at which the tailing end of the recording sheet entirely exits from the transport path 238 and the recording sheet is held pinched between the inverting rollers 245. The recording sheet is then transported to the transport path 240 by driving the inverting rollers 245. When it is desired to eject a recording sheet from the main part after turning it over, the sheet guide flapper 237 is raised and the recording sheet is transported by the inverting rollers 245 into the inverting path 239 until the recording sheet comes to a position at which the tailing end of the recording sheet remains in the transport path 238, and then the inverting rollers 245 are driven into an opposite direction thereby inverting and ejecting the recording sheet to the feed-out roller 244.

Reference numeral, 290 denotes an ejected sheet processing apparatus for aligning recording sheets ejected one by one from the main part 100 into a stack on a processing tray 294 and binding the stack of recording sheets. More specifically, when one set of printed sheets has been ejected, the ejected sheet processing apparatus 290 staples a stack of recording sheets and feeds out the stapled stack of recording sheets onto a sheet output tray 292 or a sheet output tray 293. The sheet output tray 293 is moved up and down by a motor (not shown) so that the sheet output tray 293 comes to a position corresponding to the processing tray 294 before starting the image formation process and the processing tray 294 moves as ejected recording sheets are placed on the processing tray 294 such that the top of the stacked recording sheets are flush with the processing tray 294.

Reference numeral 291 denotes a special sheet tray for holding insert sheets to be inserted between recording sheets ejected from the digital copying machine 100. Reference numeral 295 denotes a Z-folding unit for folding an ejected recording sheet into the form of Z. Reference numeral 296 denotes a binding unit for folding each set of ejected recording sheets along the center line and binding them by means of stapling. The bound stack of recording sheets is ejected onto a sheet output tray 297.

Now, described below is a process which is performed according to the first embodiment of the present invention such that when an interrupt job occurs in the middle of an image formation job being currently performed using tab sheets as recording sheets (hereinafter, such an image formation job will be referred to simply as a previous job), the sheet feeder unit holding tab sheets used in the previous job is prevented from being selected for use in the interrupt job.

In the process of setting the sheet feeder unit to be used in the interrupt job, the location of a sheet feeder unit being used in a current job is first detected, and then it is determined whether sheets held on this sheet feeder unit are tab sheets. If it turns out that they are tab sheets, the setting is made such that the sheet feeder unit is disabled from being used in the interrupt job.

Figure 3:
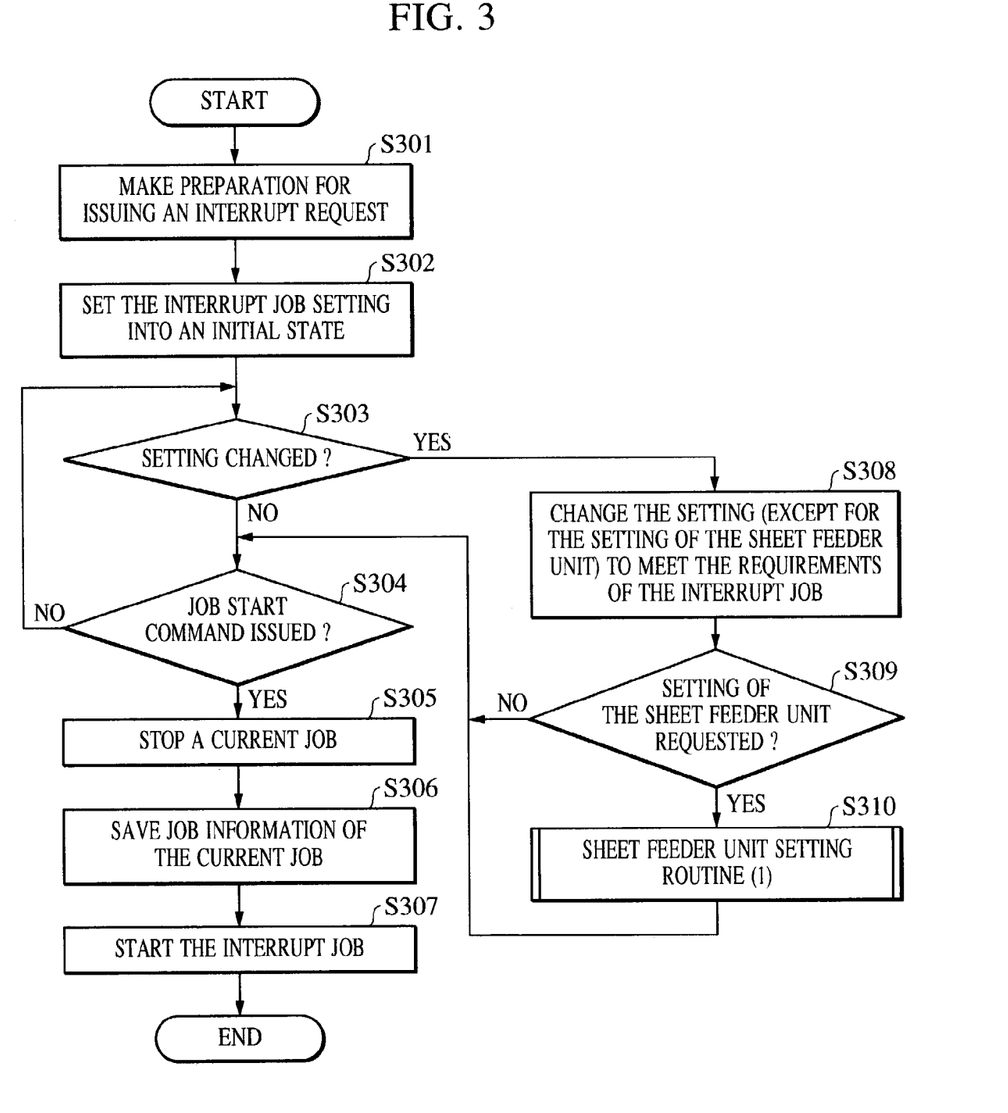
FIG. 3 is a flow chart for setting of an interrupt job, performed in the digital copying machine according to the first embodiment.

FIG. 3 is a flow chart showing a process associated with setting of an interrupt job. A program for implementing the process shown in this flow chart is executed by the job controller 106. Herein, it is assumed that an interrupt job occurs in the middle of the current job in which a copying process is being performed on a large number of sheets using A4—size normal paper held on the first sheet feeder unit and A4—size tab sheets held on the third sheet feeder unit. Although the above-described conditions are assumed in this specific example, the process associated with setting of the interrupt job may be performed in a similar manner if the current job is using ordered sheets.

Figure 12:
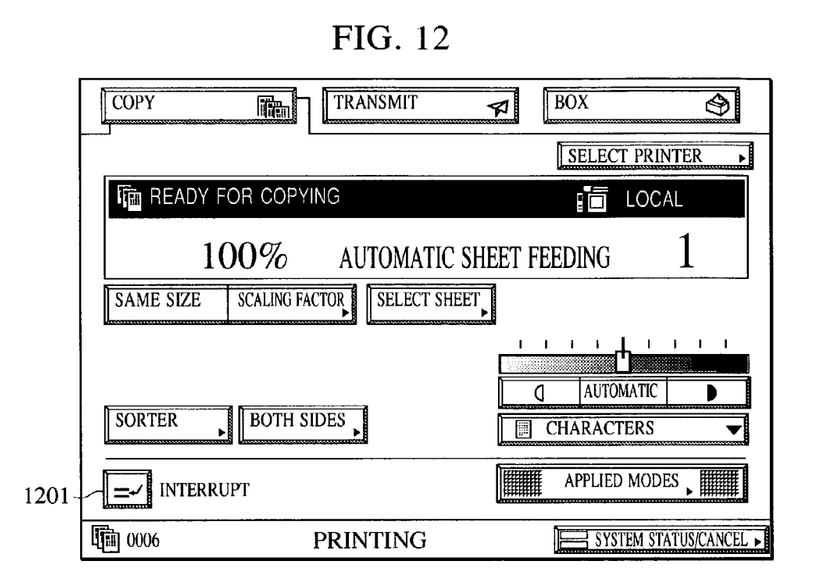
FIG. 12 is a diagram showing a screen used to issue an interrupt request.
Figure 13:
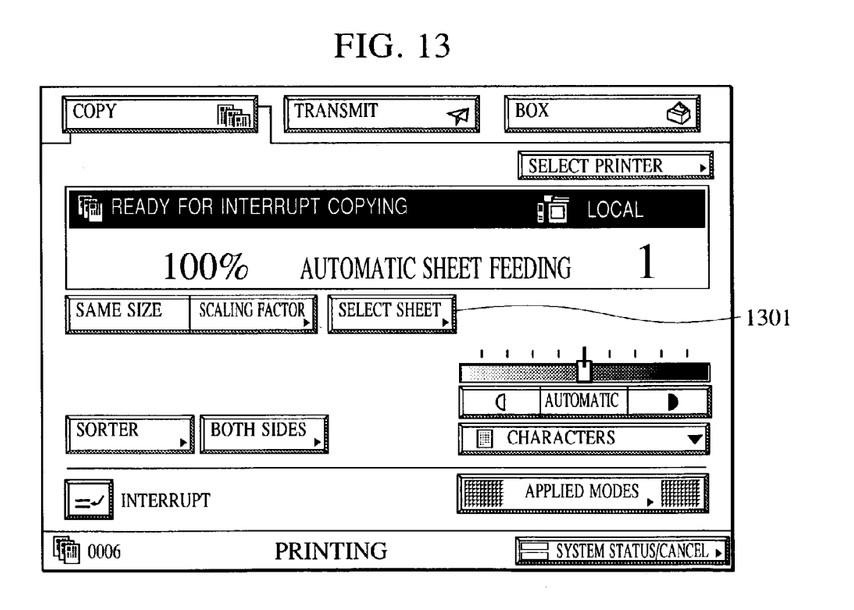
FIG. 13 is a diagram showing a screen used to perform setting of an interrupt job.

If an INTERRUPT key 1201, shown in FIG. 12, of the operation control unit 101 is clicked, it is determined that an interrupt command for interrupting an image formation job being currently performed has been selected, and a job setting screen is displayed as shown in FIG. 13 (S301). Thereafter, parameters associated with the interrupt job are set into initial values (as specified on the screen shown in FIG. 13) (S302). After that, it is determined whether a command has been input via the operation control unit 101 to change an initial value (S303). In a case in which a job start command is issued by pressing a START key on the operation control unit 101 without changing any initial parameter (S304), the current job is stopped to start the interrupt job under the conditions specified by the initial parameter values. (S305). The parameters and data indicating the status of the current job are saved in a job memory 105 (S306) and the interrupt job is started (S307).

However, if a command for changing one or more initial parameters of the interrupt job is issued in step S303, of the changed parameters, parameters other than those associated with the sheet feeder selection are updated (S308). Thereafter, it is determined whether a command for changing the setting of the sheet feeder has been issued, that is, it is determined whether a SELECT SHEET key 1301 shown in FIG. 13 has been clicked (S309). If no command for changing the setting of the sheet feeder is issued, it is determined that the process for changing settings is completed, and the process proceeds to step S304. In step S304, it is determined whether the job should be started under the changed setting conditions.

Figure 4:
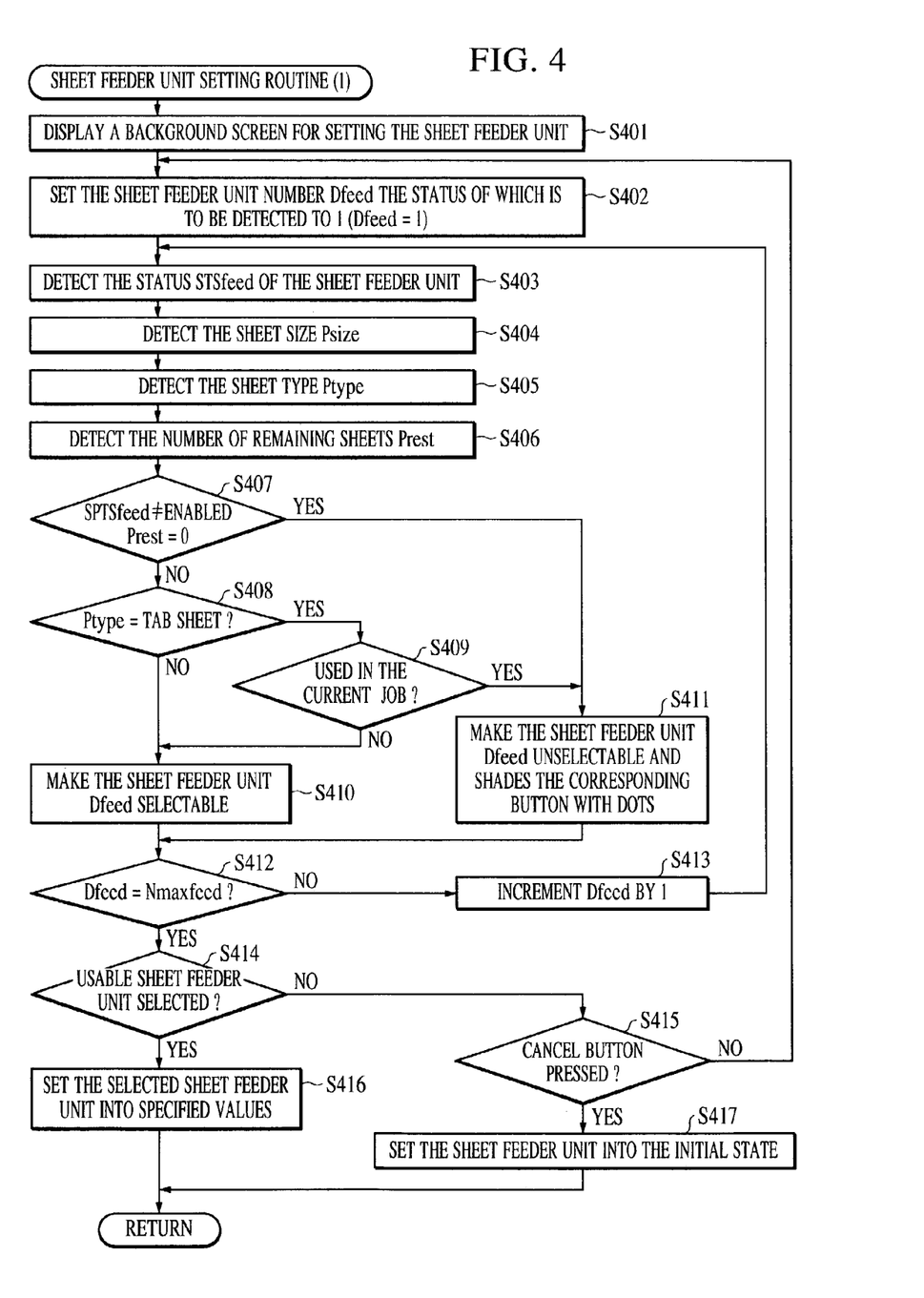
FIG. 4 is a flow chart for setting of a sheet feeder unit used in an interrupt job, performed in the digital copying machine according to the first embodiment.

On the other hand, if it is determined in step S309 that some change in the setting of the sheet feeder unit is made, the sheet feeder unit setting routine is performed in accordance with the flow chart shown in FIG. 4 (step S310). After completion of the sheet feeder unit setting routine, the process proceeds to step S304. On the other hand, if the job start command is not issued in step S304, that is, if the START key on the operation control unit 101 is not clicked, the process returns to step S303 to make preparation for a command issued to change the setting.

An operation performed in response to a command for changing the setting of the sheet feeder is described below with reference to a flow chart shown in FIG. 4. A program for implementing this operation shown in this flow chart is executed by the job controller 106.

Figure 5:
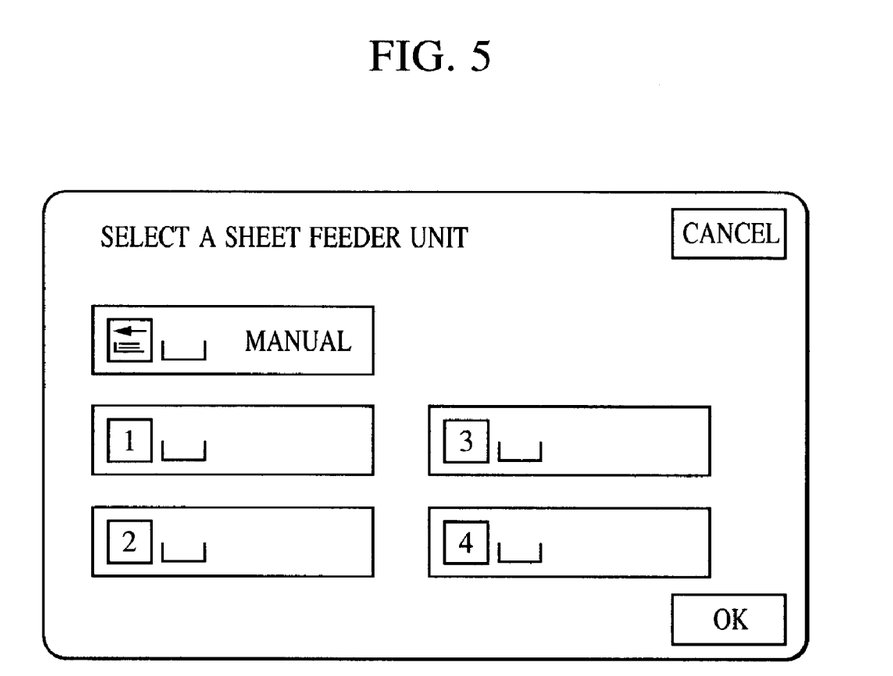
FIG. 5 is a diagram showing a sheet feeder unit selection screen which is displayed on an operation control unit in the process of setting of the sheet feeder unit to be used in an interrupt job, wherein the sheet feeder unit selection screen shown herein is in an initial state.

If a command for changing the setting of the sheet feeder is issued, that is, if the SELECT SHEET key 1301 is clicked, a sheet feeder selection screen such as that shown in FIG. 5 is displayed on the operation control unit 101 (S401). Note that FIG. 5 shows only a frame including no values indicating the status of the sheet feeder.

In order to detect the status of various sheet feeders, the sheet feeder number Dfeed is set to 1 so as to first detect the status of a sheet feeder with a sheet feeder number Dfeed of 1 (S402). A sheet feeder unit state management table shown in FIG. 6 is then referred to in order to detect the state of the sheet feeder unit designated by the sheet feeder unit number Dfeed, in terms of the status of the sheet feeder unit STSfeed, the sheet size Psize, the sheet type Ptype, and the number of remaining sheets Prest (S403 to S406).

Figure 6:
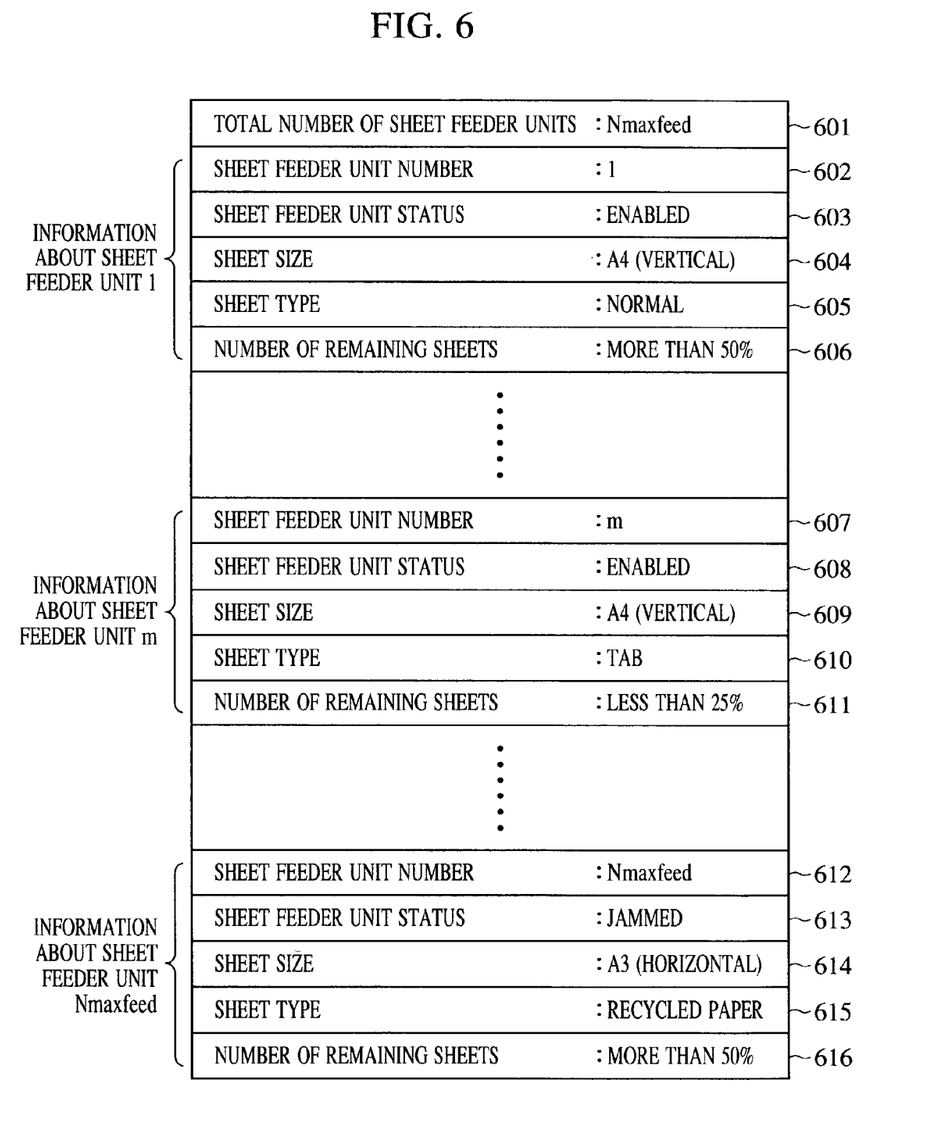
FIG. 6 is a diagram showing a sheet feeder unit state management table.

The items described in the sheet feeder unit state management table shown in FIG. 6 are described below.

The total number of sheet feeder units, Nmaxfeed (601), indicates the number of sheet feeder units electrically connected to the present digital copying machine. Sheet feeder unit numbers, Nfeed (602, 607, 612), are numbers assigned to the respective sheet feeder units in the digital copying machine so that each sheet feeder unit can be identified by an assigned sheet feeder unit number. Sheet feeder unit status information, STSfeed (603, 608, and 613), indicates the current status of a sheet feeder unit. The status may include an enabled state, a no-sheet-tray-detected state, a jammed state, a sheet transport error, and a preparing state.

Sheet size information, Psize (604, 609, 614), indicates the size of sheet held on each sheet feeder unit. Sheet type information Ptype (605, 610, and 615) indicates the type of sheets held on each sheet feeder unit. Specific examples of sheet types include normal paper, colored paper, recycled paper, thick paper, OHP sheets, and tab sheets. If the type of sheets held on a sheet feeder unit is set as tab sheet via the operation control unit, the sheet type information Ptype assigned to the sheet feeder unit is changed to tab sheet. The number of remaining sheets, Prest (606, 611, 616), indicates the number of sheets remaining in each sheet feeder unit. Although in the example in FIG. 6, there are shown only three sheet feeder units 1, m, and Nmaxfeed (wherein m is a positive integer in the range of 1<m<Nmaxfeed), Nfeed, STSfeed, Psize, Ptype, and Prest are described for each of all sheet feeder units.

After detecting various kinds of information associated with the respective sheet feeder units in steps S403 to S406, the detected results are displayed on the operation control unit. If it turns out via the above detection process that the status STSfeed of a sheet feeder unit is in a disabled state or the number of remaining sheets Prest is zero (S407), it is determined that this sheet feeder unit cannot be used in the interrupt job. In this case, a button corresponding to that sheet feeder unit is displayed on the operation control unit such that that button is shaded with a mesh, and the button is disabled so as to make impossible to select the corresponding sheet feeder unit via the operation control unit (S411).

If the decision step S407 indicates that both conditions do not hold, then it is determined whether the Ptype of the sheet feeder unit is a tab sheet (S408). If it is determined in step S408 that the Ptype is not a tab sheet, this sheet feeder unit is made selectable via the operation control unit (S410). On the other hand, if it is determined in step S408 that the Ptype is a tab sheet, it is further determined whether this sheet feeder unit is being used in the current job (S409). If it is determined in step S409 that this sheet feeder unit is being used in the current job, this sheet feeder unit is made unselectable for use in the interrupt job.

However, when a sheet feeder unit holds tab sheets, if this sheet feeder unit is not used in the current job, this sheet feeder unit is made selectable via the operation control unit, because use of the sheet feeder unit in the interrupt job will not influence the current job. Thus, via steps S403 to S411, the sheet feeder unit having a sheet feeder unit number Dfeed is checked to determine whether it can be selected for use in the interrupt job.

The sheet feeder unit number Dfeed is compared with the total number of sheet feeder units Nmaxfeed (S412). If they are not equal to each other, then it is determined that there is more sheet feeder unit to be checked, and thus Dfeed is incremented by 1 (S413). Thereafter, the process returns to step S403 to detect the status of the next sheet feeder unit. The process described above is performed repeatedly until all sheet feeder units have been checked to determine whether they can be used for the interrupt job. When all sheet feeder units have been checked, the screen displayed on the operation control unit becomes as shown in FIG. 7.

Figure 7:
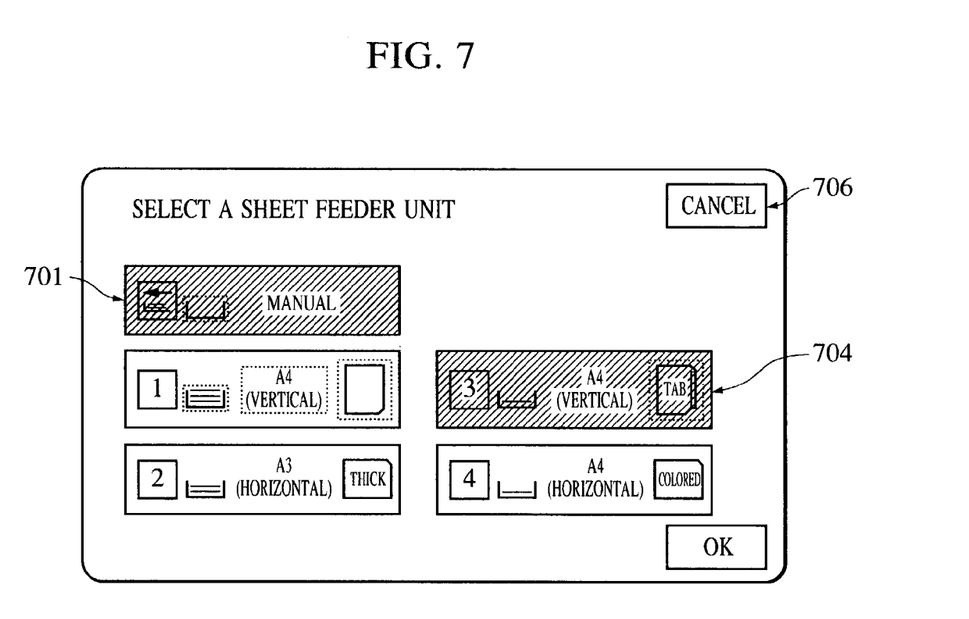
FIG. 7 is a diagram showing a screen which is displayed on the operation control unit in the process of setting of the sheet feeder unit to be used in the interrupt job, when checking of the states of all sheet feeder units is completed.

In the example of the screen shown in FIG. 7, a manual sheet feeder unit (701) holds no sheets, and a third sheet feeder unit (704) holds tab sheets, and thus corresponding buttons are shaded with a mesh to indicate that they cannot be used. The reason why the button corresponding to the third sheet feeder is shaded by the mesh is that the tab sheets were used in the previous job as described earlier. The other sheet feeder units are determined, via steps S407 to S409, to be usable for the interrupt job, and thus they are selectable. Unlike the third sheet feeder unit, the first sheet feeder unit being used in the current job is set to be selectable because the type of sheets held on the first sheet feeder unit is normal paper. The time needed to obtain and display the result of detection of the states of all sheet feeder units after displaying the sheet feeder unit selection screen (from S403 to Yes of S412) is so short that execution of the process is not perceptible to the user.

After completion of checking all sheet feeder units, it is determined whether a user has designated one of sheet feeder units selectable for the interrupt job (S414). If a sheet feeder unit has been designated, the designated sheet feeder unit is selected as the sheet feeder unit to be used in the interrupt job (S416), and the sheet feeder unit setting routine is completed. In a case in which no sheet feeder unit is designated in step S414, it is determined whether a CANCEL button 706 for exiting from the selection screen has been clicked (S415). If the CANCEL button 706 has been clicked, the setting associated with the sheet feeder unit is returned into the initial state set in step S302 (S417) and the process exits from the sheet feeder selection routine. In a case in which neither any sheet feeder unit button nor the CANCEL button 706 has been clicked, it is determined that the sheet feeder unit selection is not completed yet, and the process returns to step S402 to repeat the sheet selection process.

In the present embodiment, as described above, when a sheet feeder unit holding tab sheets is being used in a current job which is to be interrupted, the sheet feeder unit is removed from a group of sheet feeder units selectable for use in an interrupt job so as to disable that sheet feeder unit from being selected for use in the interrupt job.

Second Embodiment

In a second embodiment of the present invention described below, there is disclosed a digital copying machine in which, when setting is performed for a job to be performed by interrupting a current job in which an image is formed on tab sheets, if a sheet feeder unit holding the tab sheets being used in the current job to be interrupted is selected for use in the interrupt job, a warning is given that sheets should be exchanged, and the setting of the interrupt job is not made effective until a change in the state of the sheet feeder unit is detected.

The basic operation of the digital copying machine according to the second embodiment is similar to that of the first embodiment except for some differences in the sheet feeder unit setting routine and in the operation performed immediately before starting an interrupt job.

Figure 8:
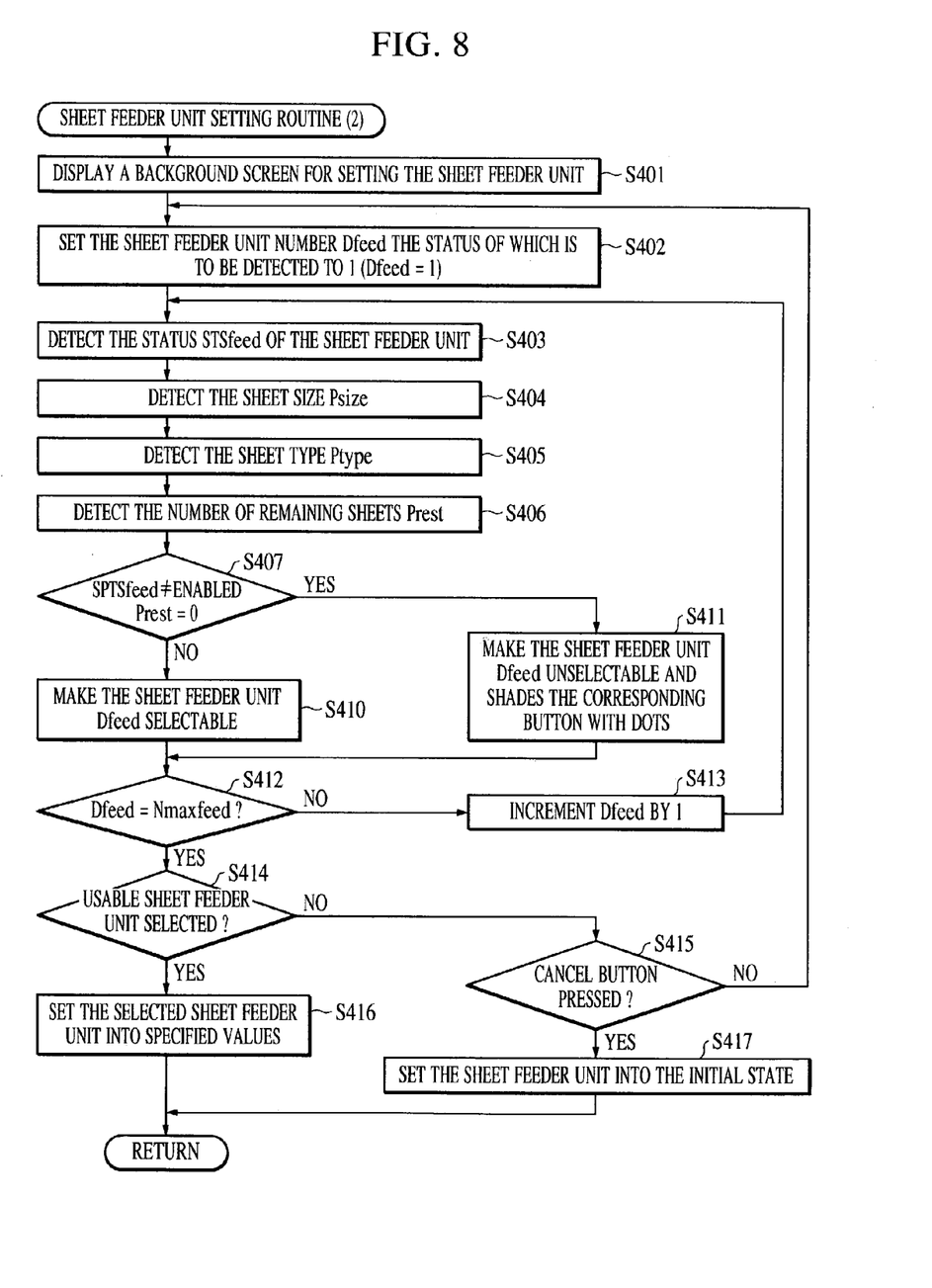
FIG. 8 is a flow chart for setting of a sheet feeder unit used in an interrupt job, performed in a digital copying machine according to a second embodiment.

FIG. 8 is a flow chart of the sheet feeder unit setting routine according to the second embodiment. A program for implementing the sheet feeder unit setting routine shown in this flow chart is executed by the job controller 106. The difference between the flow here and the flow in the first embodiment described above with reference to FIG. 4 is that the flow here does not include steps S408 and S409 associated with the process on a sheet feeder unit holding tab sheets, because in the second embodiment the sheet feeder unit holding tab sheets being used in a current job is allowed to be used in an interrupt job.

Figure 9:
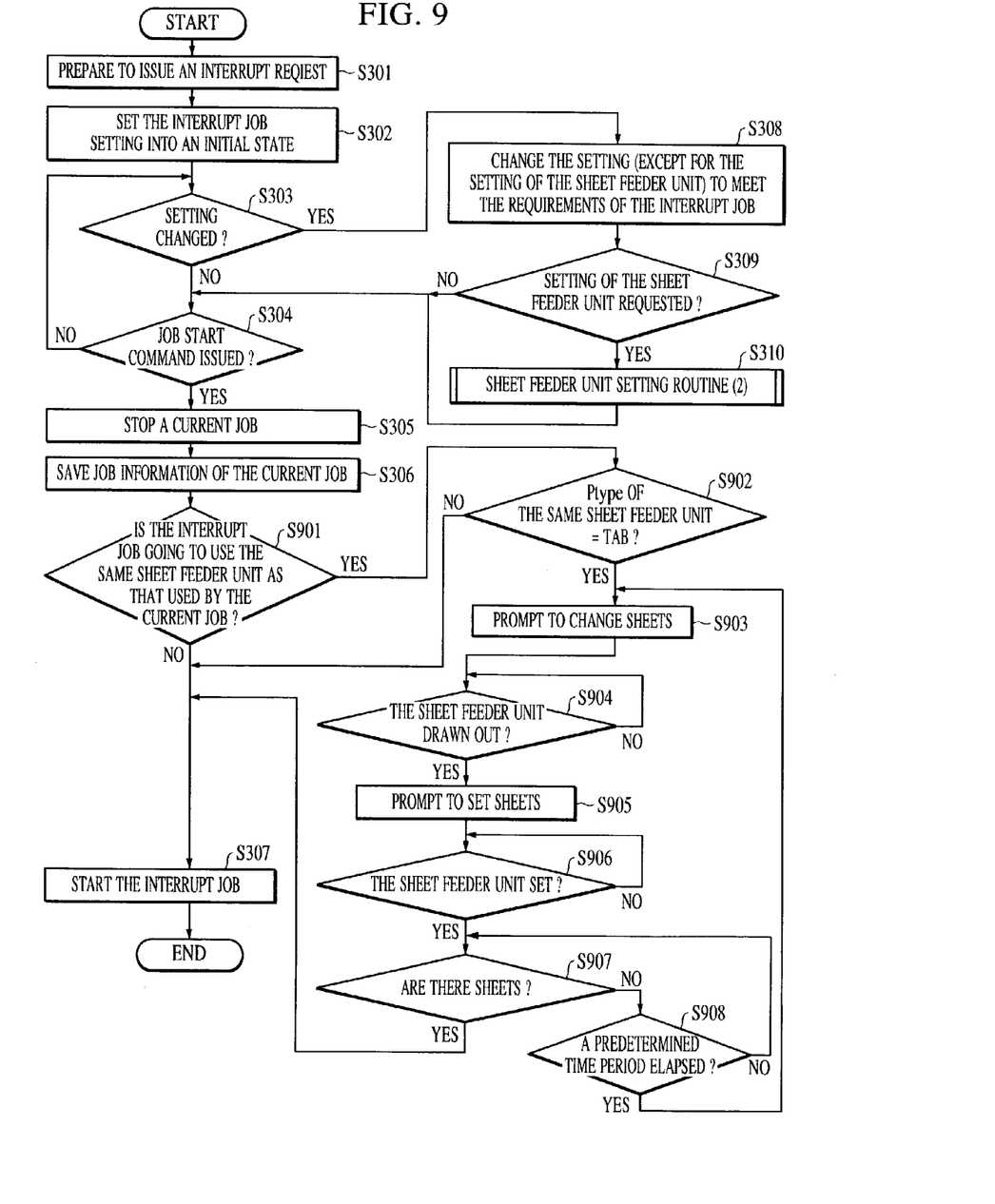
FIG. 9 is a flow chart for setting of an interrupt job, performed in the digital copying machine according to the second embodiment.

FIG. 9 is a flow chart showing a process associated with setting of an interrupt job according to the second embodiment. A program for implementing this process according to the flow chart shown in FIG. 9 is executed by the job controller 106. The difference of this process from that according to the first embodiment described above with reference to FIG. 3 is that the process includes an additional step between steps S306 and S307, to control the flow depending on the selection of a sheet feeder unit to be used in an interrupt job.

If a current job is interrupted in step S305 and job information associated with the interrupted job is saved in step S306, it is determined whether a sheet feeder unit used in the interrupted job is going to be used in an interrupt job (S901). If it is determined in step S901 that the sheet feeder unit to be used in the interrupt job is not the same as the one to be used in the interrupt job, then the interrupt job is immediately started as in the first embodiment (S307).

However, if it is determined in step S901 that the same sheet feeder unit is going to be used, it is further determined whether the type, Ptype, of sheets held on that sheet feeder unit is tab sheet (S902). If it is turns out that Ptype is not tab sheet, the interrupt job is immediately started as in the previous case. However, if the type of sheets held on the selected sheet feeder unit is tab sheet, it is necessary to replace the stack of sheets held on the selected sheet feeder unit with sheets to be used in the interrupt job.

Figure 10:
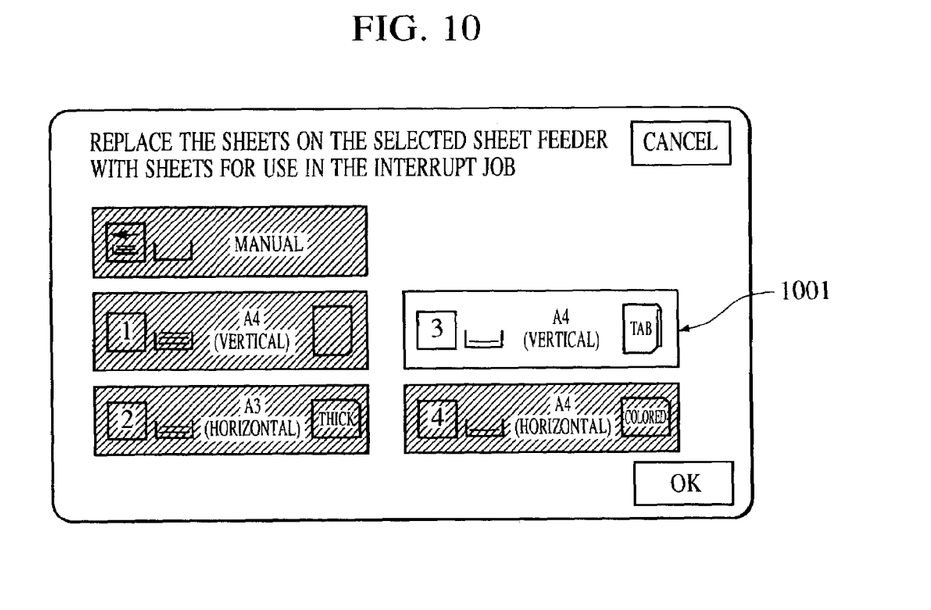
FIG. 10 is a diagram showing a screen on which a warning is displayed to prompt a user to exchange sheets placed on a sheet feeder unit selected in an interrupt job setting process.
Figure 11:
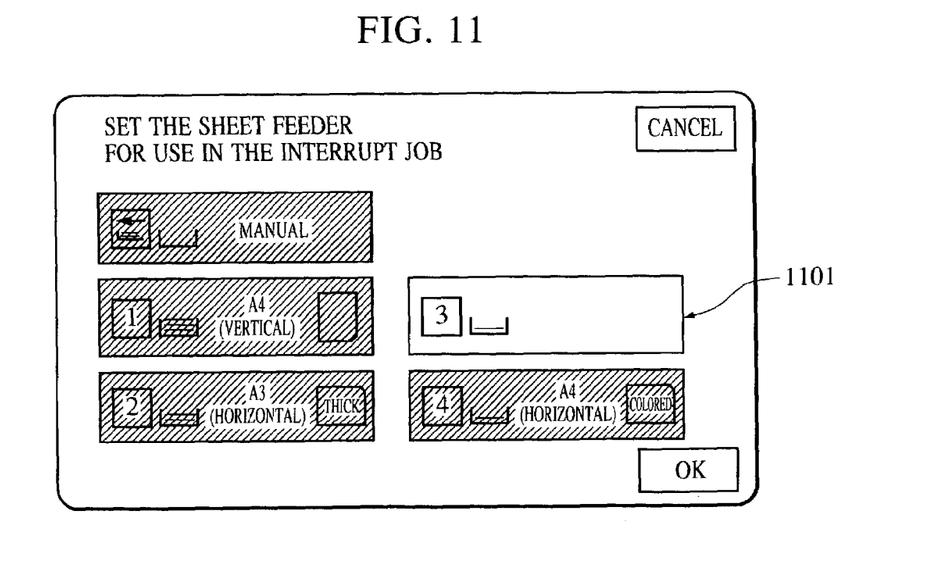
FIG. 11 is a diagram showing a screen on which a warning is displayed to prompt a user to replace sheets placed on a drawn-out sheet feeder unit with sheets for use in an interrupt job and set the sheet feeder unit back into the apparatus.

To exchange the stack of sheets, a screen such as that shown in FIG. 10 is first displayed on the operation control unit 101 so as to prompt a user to exchange the sheets held on the selected sheet feeder unit (S903). Thereafter, the status STSfeed of the selected sheet feeder unit is checked to determine whether the sheet feeder unit has been drawn out from the image forming apparatus (S904). If it is determined that the sheet feeder unit has been drawn out, a screen such as that shown in FIG. 11 is displayed on the operation control unit 101 so as to prompt the user to place, on the drawn-out sheet feeder unit, sheets to be used in the interrupt job (S905). The status STSfeed of the selected sheet feeder unit is again checked to determine whether the sheet feeder unit holding a stack of sheets to be used in the interrupt job has been set into the image forming apparatus (S906).

If it is determined in step S906 that the sheet feeder unit has been set, then the number of remaining sheets Prest is checked to determine whether sheets to be used in the interrupt job have been correctly placed (S907). If it is detected that sheets are present, it is determined that the stack of sheets has been correctly exchanged, and the interrupt job is started. However, if the presence of sheets cannot be detected within a period of time with a predetermined length (S908), it is determined that sheets are not correctly placed on the sheet feeder unit, and the flow returns to step S903 to repeat the process of exchanging sheets on the sheet feeder unit.

In the present embodiment, as described above, when setting is performed for a job to be performed by interrupting a current job in which an image is formed on tab sheets, if a sheet feeder unit holding the tab sheets being used in the current job to be interrupted is selected for use in the interrupt job, a warning is given that sheets should be exchanged, and the setting of the interrupt job is not made effective until a change in the state of the sheet feeder unit is detected.

Other Embodiments

In the first and second embodiments describe above, when a sheet feeder unit holding tab sheets is being used in a current image formation job, the sheet feeder unit being used in the current image formation job is prevented from being used in an interrupt image formation job. However, in the present invention, the type of sheets dealt with in the above-described manner is not limited to tab sheets, but the present invention can also be applied to a case in which a sheet feeder unit holds sheets whose order is important. A specific example of such a set of ordered sheets is a set of ordered sheets which have been printed in advance. That is, the present invention also includes, in its scope, a case in which when a sheet feeder unit for feeding ordered sheets is used in a current image formation job, the sheet feeder unit being used in the current image formation job is prevented from being used in another image formation job.

In the first and second embodiments described above, when a sheet feeder unit holding tab sheets is used in a current image formation job, the sheet feeder unit being used in the current image formation job is prevented from being used in an interrupt image forming job. However, in the present invention, the restriction imposed on image formation jobs is not limited to the interrupt image formation job, but the present invention may also be applied to a case in which after completion of a current image formation job, a following image formation job is started. That is, the present invention also includes, in its scope, a case in which when a sheet feeder unit for feeding ordered sheets is being used in a current image formation job, the sheet feeder unit being used in the current image formation job is prevented from being used in a following image formation job.

In the first and second embodiments described above, when a sheet feeder unit holding tab sheets is used in a current image formation job, the sheet feeder unit being used in the current image formation job is prevented from being selected, via the operation control unit of the digital copying machine, for use in an interrupt image forming job. However, the present invention is not limited to the process associated with the operation control unit of the digital copying machine, but the present invention may also be applied to a process associated with a printer driver implemented on a personal computer to control a printing operation performed by an image formation apparatus. That is, the present invention also includes, in its scope, a computer-readable storage medium including a printer driver program stored thereon for causing an image forming apparatus to form an image, wherein the printer driver program includes a code for determining a feeder used in a previous image formation job, a code for determining whether sheets placed on the feeder used in the previous image formation job are ordered, and a code for, in a case in which the sheet feeder for feeding ordered sheets is used in the previous image formation job, preventing the sheet feeder used in the previous image formation job from being used in a subsequent image formation job. The printer driver program is stored on a storage medium such as a CD-ROM or a floppy disk. The printer driver program is executed after the printer driver program is read by a personal computer and installed onto a hard disk disposed in the personal computer. Screens displayed on a display of the personal computer under the control of the printer driver program are similar to those described above with reference to the first and second embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims.

What is claimed is:

1. An image forming apparatus comprising:
   a plurality of feeders, each for feeding a sheet;
   an image forming unit for performing an image formation job so as to form an image on a sheet fed from one of the feeders; and
   a controller for interrupting a current image formation job, performing an interrupt image formation job, and resuming the current image formation job after completion of the interrupt image formation job,
   wherein in a case in which the current image formation job used a sheet feeder for feeding sheets set in a predetermined order said controller prevents the sheet feeder used in the current image formation job from being used in the interrupt image formation job.

2. An image forming apparatus according to claim 1, wherein the sheets set in a predetermined order are tab sheets.

3. An image forming apparatus according to claim 1, wherein the sheets set in a predetermined order are ordered sheets which have been printed in advance.

4. An image forming apparatus according to claim 1, wherein in a case in which the current image formation job does not use a sheet feeder for feeding sheets set in a predetermined order, the controller permits a sheet feeder used in the current image formation job to be used in the interrupt image formation job.

5. An image forming apparatus according to claim 1, wherein in a case in which the current image formation job uses a sheet feeder for feeding sheets set in a predetermined order, the controller disables and prevents from being selected the sheet feeder used in the current image formation job, in setting of the interrupt image formation job, for use in the interrupt image formation job.

6. An image forming apparatus according to claim 1, wherein if a sheet feeder used in the current image formation job is selected, in setting of the interrupt image formation job, said controller prompts a user to exchange sheets to be fed by the sheet feeder used in the current image formation job.

7. An image forming apparatus comprising:
   a plurality of sheet feeders, each for feeding a sheet;
   an image forming unit for performing an image formation job so as to form an image on a sheet fed from one of the plurality of sheet feeders; and
   a controller for performing a subsequent image formation job after completion of a current image formation job;
   wherein in a case in which the current image formation job uses a sheet feeder for feeding sheets set in a predetermined order, the controller prevents the sheet feeder used in the current image formation job from being used in the subsequent image formation job.

8. An image forming apparatus according to claim 7, wherein the sheets set in a predetermined order are tab sheets.

9. An image forming apparatus according to claim 7, wherein the sheets set in a predetermined order are sheets which have been printed in advance.

10. An image forming apparatus according to claim 7, wherein in a case in which the current image formation job does not use a sheet feeder for feeding sheets set in a predetermined order, the controller permits a sheet feeder used in the current image formation job to be used in the subsequent image formation job.

11. An image forming apparatus according to claim 7, wherein in a case in which the current image formation job uses a sheet feeder for feeding sheets set in a predetermined order, the controller disables and prevents from being used in the subsequent image formation job the sheet feeder used in the current image formation job.

12. An image forming apparatus according to claim 7, wherein if a sheet feeder used in the current image formation job is selected, in setting of the subsequent image formation job, said controller prompts a user to exchange sheets to be fed by the sheet feeder used in the current image formation job.

13. A method of controlling an image forming apparatus, said method comprising the step of:
   determining which feeder from a plurality of feeders was used in a current image formation job;
   determining whether sheets set in the feeder used in the current image formation job are set in a predetermined order; and
   in a case in which the current image formation job uses a sheet feeder for feeding sheets set in a predetermined order, preventing the sheet feeder used in the current image formation job from being used in the subsequent image formation job.

14. A computer-readable storage medium including a printer driver program stored thereon for causing an image forming apparatus to form an image on a sheet fed from one of a plurality of feeders, said printer driver program comprising:
   a code for determining which feeder is used in a current image formation job;
   a code for determining whether sheets placed on the feeder used in the current image formation job are set in a predetermined order; and
   a code for in a case in which the sheet feeder for feeding sheets set in a predetermined order is used in the current image formation job, preventing the sheet feeder used in the current image formation job from being used in a subsequent image formation job.

* * * * *

UNITED STATES PATENT AND TRADEMARK OFFICE
CERTIFICATE OF CORRECTION

PATENT NO. : 7,187,480 B2  Page 1 of 1
APPLICATION NO. : 10/284145
DATED : March 6, 2007
INVENTOR(S) : Hidenori Sunada et al.

It is certified that error appears in the above-identified patent and that said Letters Patent is hereby corrected as shown below:

IN THE DRAWINGS:
Sheet No. 9, Figure 9, "REQIEST" should read --REQUEST--.

COLUMN 2:
Line 2, "along" should read --long--.
Line 63, "refer" should read --reference--.

COLUMN 5:
Line 50, "an" should read --a--.

COLUMN 6:
Line 8, "numeral, 290" should read --numeral 290--.

COLUMN 10:
Line 15, "it is" should read --it--.
Line 60, "describe" should read --described--.

COLUMN 13:
Line 8, "step" should read --steps--.

Signed and Sealed this

Twenty-seventh Day of November, 2007

JON W. DUDAS
*Director of the United States Patent and Trademark Office*